United States Patent [19]
Knight

[11] Patent Number: 5,398,476
[45] Date of Patent: Mar. 21, 1995

[54] SECURING MEANS FOR SOLAR ABSORBERS

[76] Inventor: Stephen T. Knight, 349 Bayview Street, Holleywell Gold Coast, Queensland 4216, Australia

[21] Appl. No.: 27,535

[22] Filed: Mar. 8, 1993

[30] Foreign Application Priority Data

| | | |
|---|---|---|
| Mar. 6, 1992 | [AU] Australia | PL1207 |
| Aug. 13, 1992 | [AU] Australia | PL4079 |

[51] Int. Cl.⁶ .......................... E04D 13/00; F24J 2/00
[52] U.S. Cl. .......................... 52/698; 52/518; 248/68.1; 126/622
[58] Field of Search .......................... 126/622, 621, 906; 52/698, 518; 248/68.1

[56] References Cited

U.S. PATENT DOCUMENTS

| | | | |
|---|---|---|---|
| 4,163,445 | 8/1979 | Stanger | 126/622 |
| 4,202,319 | 5/1980 | Vinz | 126/622 |
| 4,204,520 | 5/1980 | Rosenberg | 126/622 |
| 4,221,208 | 9/1980 | Murphy, Jr. | 126/622 |
| 4,364,374 | 12/1982 | Brazzola | 126/622 |
| 4,377,199 | 3/1983 | Heidtmann | 52/518 |
| 4,517,961 | 5/1985 | Bloor et al. | 126/622 |
| 4,606,327 | 8/1986 | Bloor et al. | 126/622 |
| 4,946,512 | 8/1990 | Fukuroi et al. | 52/518 |
| 5,277,006 | 1/1994 | Ruster | 248/68.1 |

*Primary Examiner*—Carl D. Friedman
*Assistant Examiner*—Wynn E. Wood
*Attorney, Agent, or Firm*—Hoffman, Wasson & Gitler

[57] ABSTRACT

A securing means for securing a solar absorber of the multi-tube type to a roof of a building, the securing means comprising an elongated element having a number of resilient fingers which resiliently engage and hold the absorber to the element. For use with a tile roof comprising a number of overlapping roof tiles, the element includes a tongue at one end for location between overlapping portions of the tile and a hook at the opposite end of the element for engagement with the end of the lowermost tile. For application to metal roofs, the element may be fixed to the roof by fasteners.

20 Claims, 4 Drawing Sheets

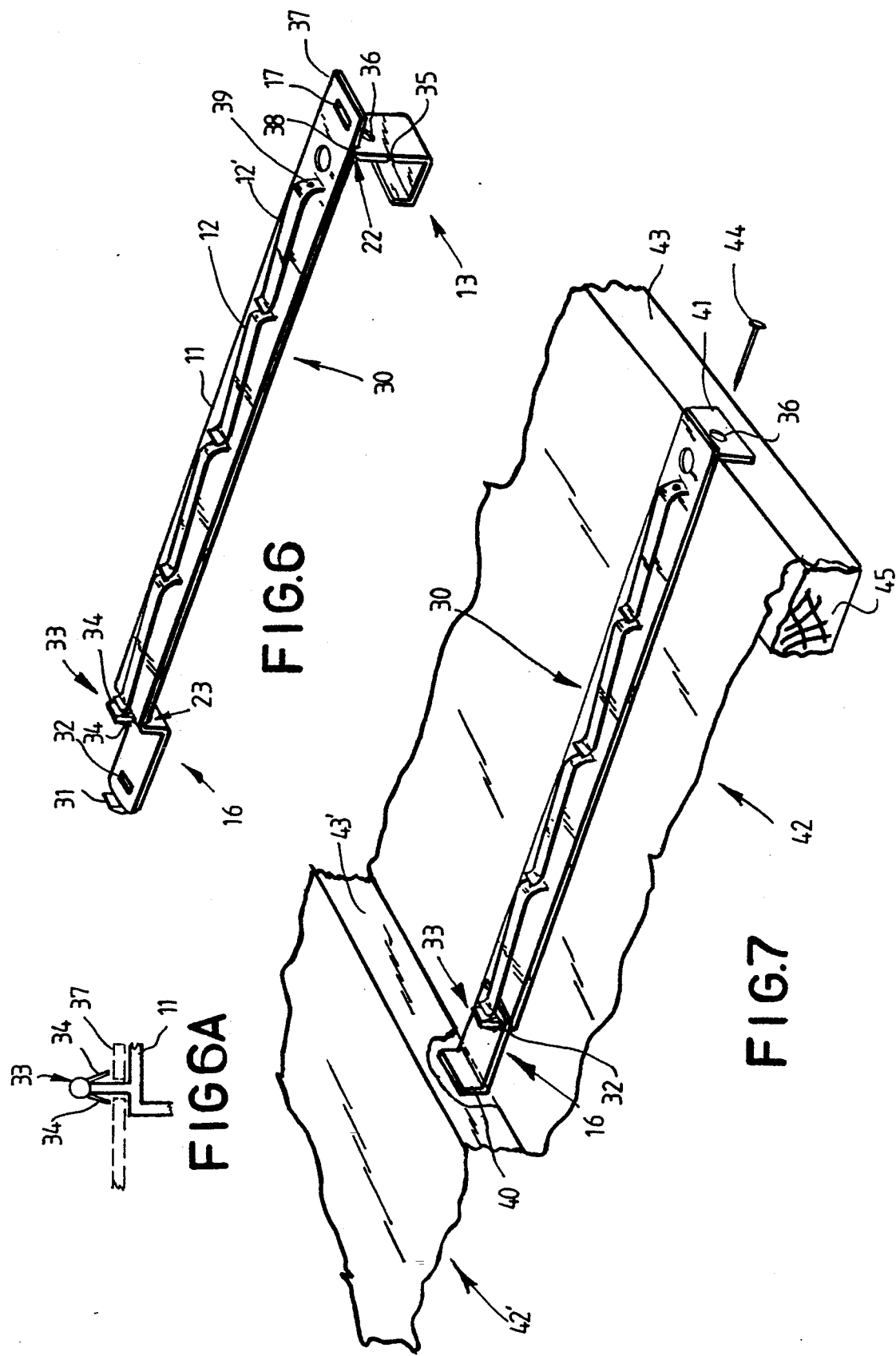

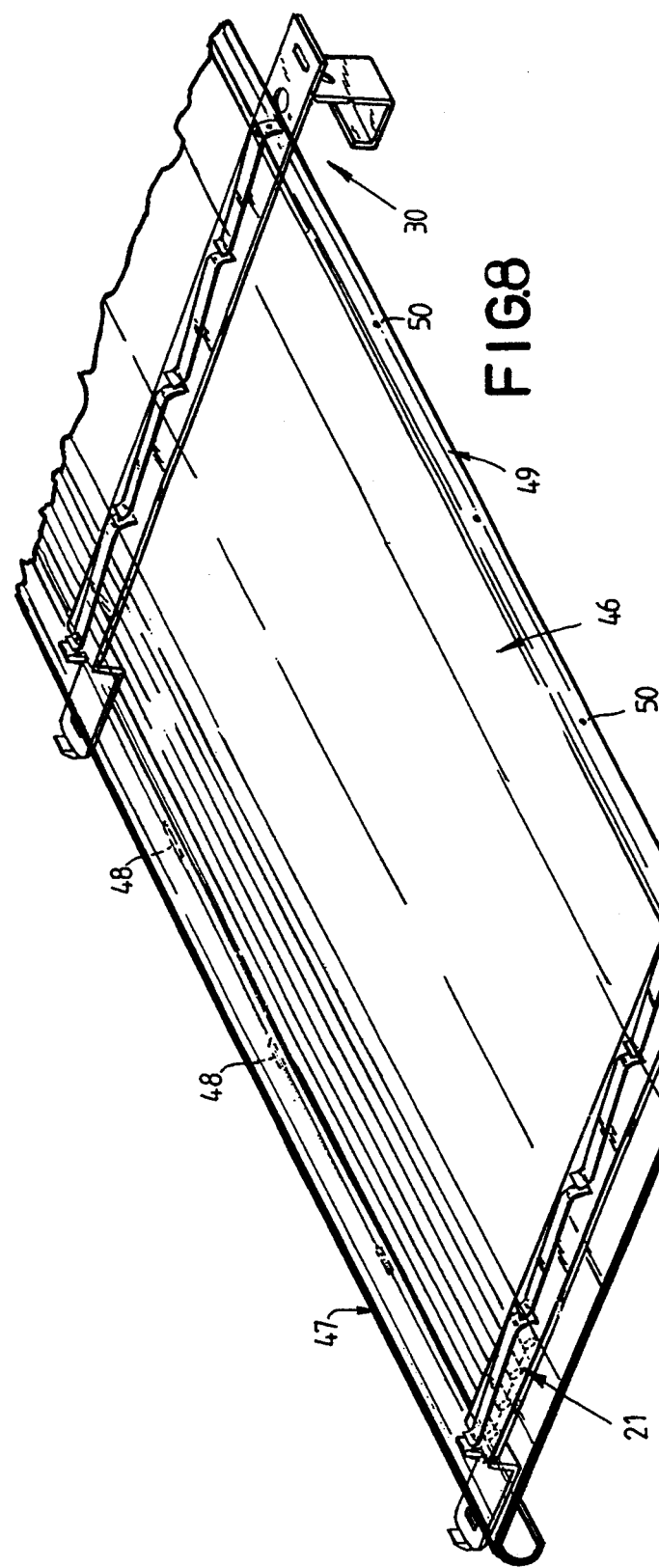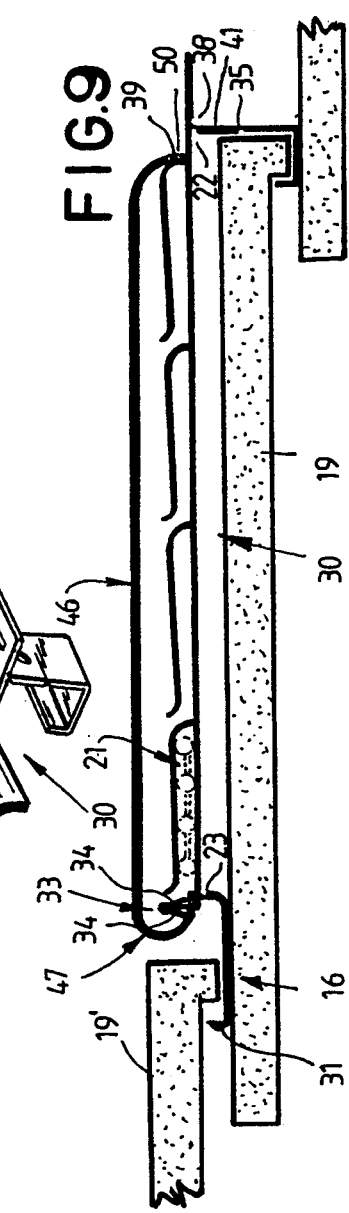

a roof, said securing means including an elongated element adapted to extend along and be retained to said roof, and holding means associated with said element for holding a member to be secured to said roof in such a manner that said member extends transversely of said element.

SECURING MEANS FOR SOLAR ABSORBERS

TECHNICAL FIELD

This invention relates to securing means for securing a member or members to a roof of a building. In a particular but not exclusive aspect, the present invention relates to securing means for securing solar absorbers of the multi-tube type to a roof.

BACKGROUND ART

In many situations which arise where a member or members are to be secured to a roof of a building, difficulties occur in ensuring that such securing means hold the member to the building in an efficient manner. Such situations arise where say it is desired to secure cables or wires to a roof, for example television aerial wires. Other situations where this problem is encountered is in the securing of solar energy absorbers and in particular solar energy absorbers of the type used for heating swimming pools to a roof. In the latter situation the absorbers often comprise multi-tube plastic or synthetic rubber integrally interconnected tubes which are often located within and extend along recesses in roof tiles or alternatively in the troughs of corrugated roofing. The fixing methods currently employed sometimes require the use of a bonding compound such as silicon into which the absorber is embedded, however, such compounds do not prove particularly effective in high wind situations, are messy to apply and are not aesthetically pleasing. Another method used has involved wire passed through apertures in the tiles as the securing means. Use of this method is time consuming and awkward. In the above described arrangements, the absorbers are located in the tile recesses or roof corrugations, however, it has been found just as effective to have the absorbers run transversely of the recesses. Similar problems to that described above are encountered in securing absorbers in this attitude to a roof.

SUMMARY OF THE INVENTION

The present invention aims to overcome or at least alleviate one or more of the above disadvantages by providing securing means for securing members to a roof, such as a tiled roof, or a metal roof, for example a corrugated roof or other roof decking. The present invention is particularly suitable for securing absorbers of solar energy heating systems to roofs but may be equally applied to securing other members in position upon a roof, for example manifolds of solar heating assemblies, ducts, wires or cables of any type or any other member to a roof. Other objects and advantages of the invention will become hereunder.

The present invention thus provides in a first preferred aspect securing means for securing a member to a roof, said securing means including an elongated element adapted to extend along and be retained to said roof, and holding means associated with said element for holding a member to be secured to said roof in such a manner that said member extends transversely of said element.

In one form, the roof comprises a tiled roof comprising a plurality of overlapping roof tiles and the element includes means at one end adapted for location between overlapping portions of adjacent tiles. Preferably, also, the element in this embodiment includes means at its opposite end adapted to be engaged with the end of the lowermost of said overlapping tiles remote from the overlapping portions.

Preferably the element holding means includes at least one clip or the like for engaging the member, the clip being preferably in the form of a resilient member formed integrally with or secured to the element. The resilient member suitably includes a resilient clip secured to the element at one end and free at its opposite end. Preferably a series of clips or the like are provided along the element so as to enable holding of a plurality of members thereto.

The means at the one end of the element suitably comprises a tongue adapted to be located between overlapping portions of tiles and upon which an upper roof tile may seat to hold the tongue in position and prevent the element lifting from the tile on which it is seated. The tongue is preferably stepped downwardly from the element to space the element from the tile and may include a stop at its free end for further restraining detachment from a tile.

The means at the opposite end of the element for engaging a roof tile suitably comprises a hook for location under the leading, normally lower end of the tile. Suitably the hook is of generally L-shaped form having one longer leg extending from and integrally connected to the element and a shorter leg spaced from the longer leg. The normally lower end of the tile is thus received between the longer leg and the shorter leg.

In a further form, the roof comprises a metal roof such as a corrugated metal roof formed of roof sheeting and the element is adapted to be connected to the roof by fasteners of any suitable form.

The elongated support may be made up of a plurality of interconnected elements of the type described above for use with tile roofs. For this purpose each element may be apertured at one end and be provided with an upstanding lug at its opposite end for location within an aperture or slot of an adjacent member so that a string or series of longitudinally aligned such elements may be interconnected. Where formed from elements of the type used for tile roofs the tongue and hook of the element are preferably formed so as to enable them to be detachable from the elements. For this purpose the tongue and hook may be attached to the remainder or main body of the element by a reduced thickness or necked portion at which the tongue and hook may be severed by, for example being simply broken away therefrom.

Alternatively, the elongated support may be constructed in continuous lengths provided with a series of holding means thereon, the support then being cut as desired to the required length.

The support may be secured to a metal roof by means of fasteners such as screws. For this purpose, the elements which form the support may be provided with an aperture or apertures to receive a fastener or fasteners therethrough.

The securing means of the invention may be used for forming a solar absorber assembly, such an assembly including a plurality of securing means for supporting solar absorbers such as multi-tube absorbers and a transparent panel mounted to the securing means over the absorber or absorbers.

BRIEF DESCRIPTION OF THE DRAWINGS

In order that the invention may be more readily understood and put into practical effect, reference will now be made to the accompanying drawings which illustrate preferred embodiments of the invention and wherein:

FIG. 6 is an isometric view of a second form of securing means according to the present invention;

FIG. 6A illustrates the connection between a pair of elements of the type shown in FIG. 6;

FIG. 7 illustrates the manner in which the securing means of FIG. 6 may be used with metal tile roofs;

FIG. 8 illustrates the combination of a plurality of clips of the type shown in FIG. 6 with a transparent panel to form a solar absorber assembly; and FIG. 9 is an end view of an assembly of the type shown in FIG. 8 associated with a tile of a tile roof.

DETAILED DESCRIPTION OF THE PREFERRED EMBODIMENTS

Figure 1:
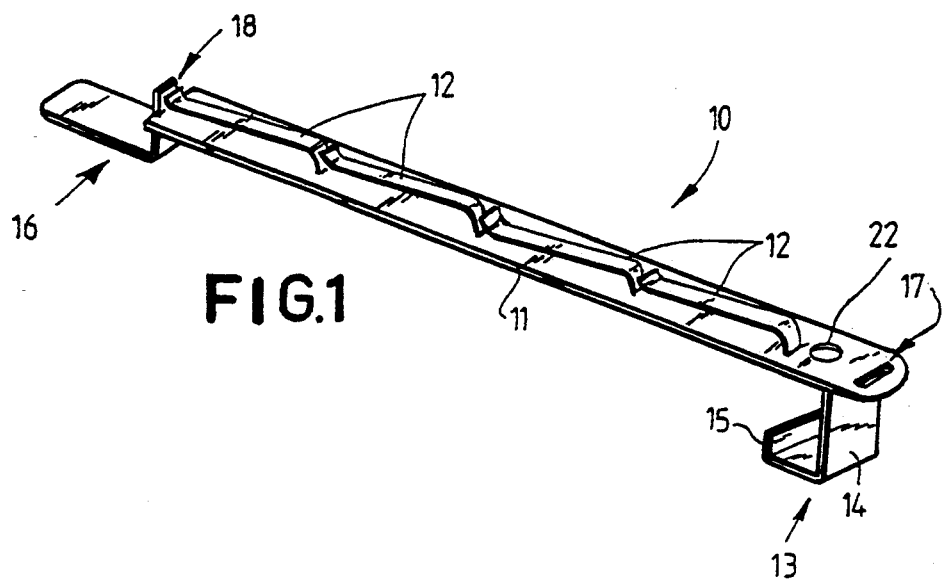
FIG. 1 is an isometric view of a first form of securing means according to the present invention.

Referring to the drawings and firstly to FIG. 1, there is illustrated securing means 10 according to the present invention comprising an elongated planar strip-like element 11 having located thereon or formed integrally therewith a plurality of clipping or holding members 12 which are in the form of resilient fingers secured or integrally connected to the element 11 at one end and free at their opposite end and which are adapted to resiliently engage a member to be secured to a roof. The element 11 at one end is provided with a hook 13 which may locate under the leading end of a tile in the manner described below. The hook 13 is of generally L-shaped form and has its longer lower leg 14 integrally formed with the element 11 and extending downwardly therefrom and a shorter upright leg 15 spaced from the leg 14. At its opposite end, the element 11 is provided with a downwardly stepped forwardly extending tongue 16 adapted to seat on the top surface of a tile. The element 11 additionally includes at its end adjacent the hook 13 a transverse slot or aperture 17 and at the opposite end an upstanding lug 18 for a purpose described further below.

Figure 2:
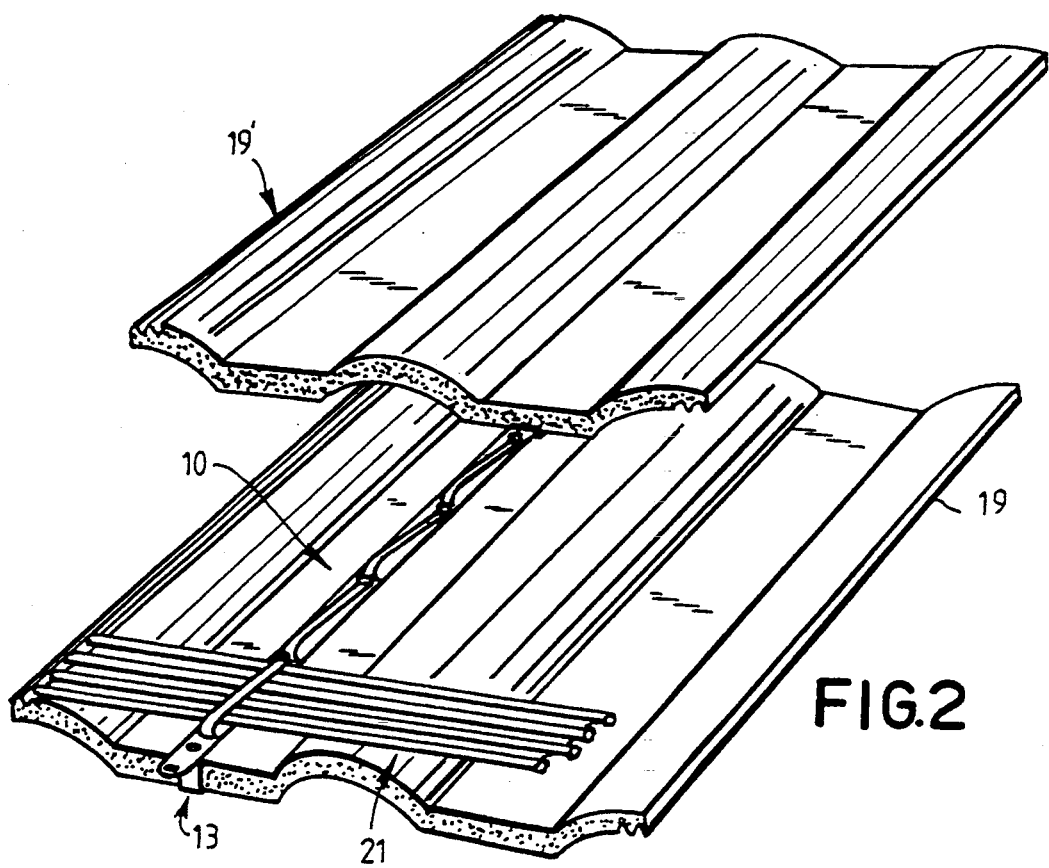
FIG. 2 illustrates the application of the securing means of FIG. 1 to a roof formed from roof tiles.
Figure 3:
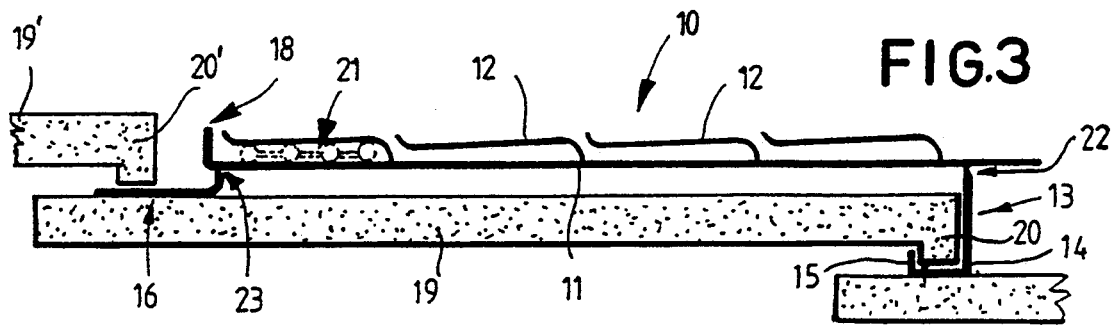
FIG. 3 is a sectional view showing the relationship between the securing means of the invention and roof tiles.

In use and as shown in FIGS. 2 and 3 the securing means 10 is located relative to a roof tile 19 so that the hook 13 locates under the leading end 20 of the tile 19 which is received between the hook legs 14 and 15 and so that the tongue 16 rests on the upper surface of the tile 19 to be overlapped in use by the leading end 20' of an adjacent upper tile 19'. It will be seen from FIG. 3 that the hook 13 in co-operation with the tile end 20 captures and restrains the securing means 10 from detachment from the tile 19 at its normally lower end. At its opposite upper end the tongue 16 being sandwiched between adjacent overlapping tiles 19 and 19' is prevented from lifting from the surface of the tile 19. As shown the hook 13 and downwardly stepped tongue 14 in this embodiment space the element 11 from the upper surface of the tile on which the securing means 10 is located.

The securing means 10 of the present invention is particularly suited for securing multi-tube absorbers 21 of the type used in solar heating apparatus to a roof tile so that the absorbers 21 extend in a direction transversely relative to the roof tiles 19 and 19' and element 11. For this purpose the absorbers 21 are simply slipped under the clipping members 12 if necessary by deflecting the members 12 upwardly and are held in position by the resilience inherent in the clipping members 12.

Respective securing means 10 may be located on laterally spaced tiles so that the absorber 21 or any other member to be held to the roof is secured at spaced apart positions across the roof.

Figure 4:
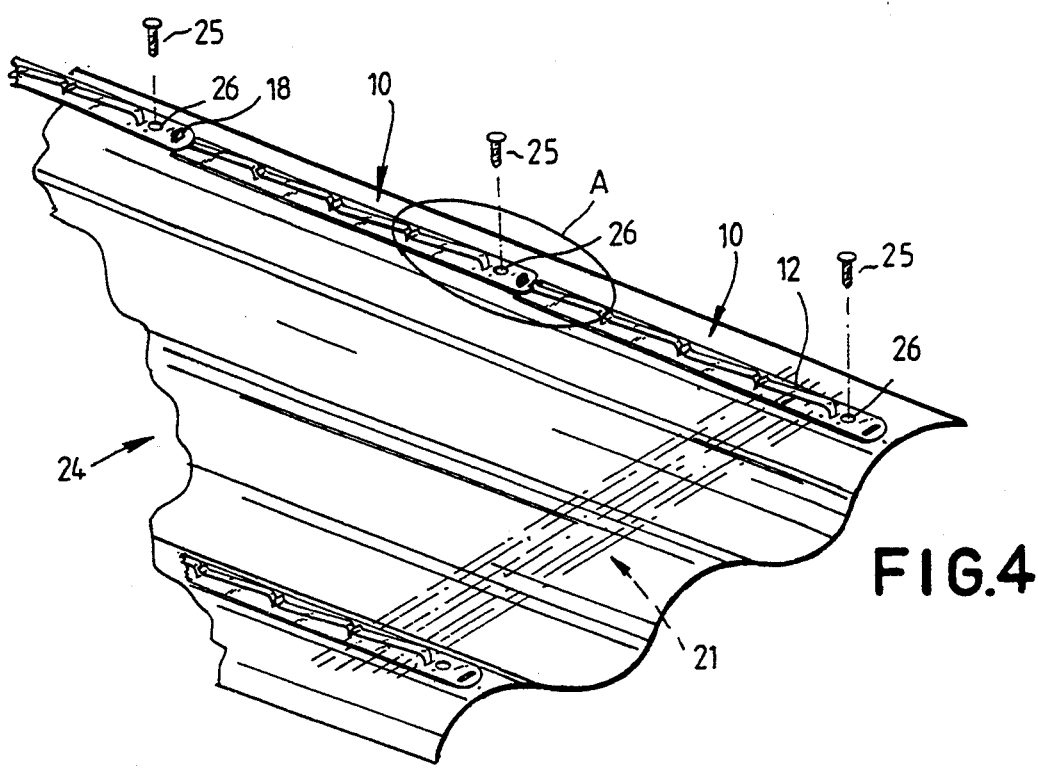
FIG. 4 illustrates an application of the invention to a corrugated roof.
Figure 5:
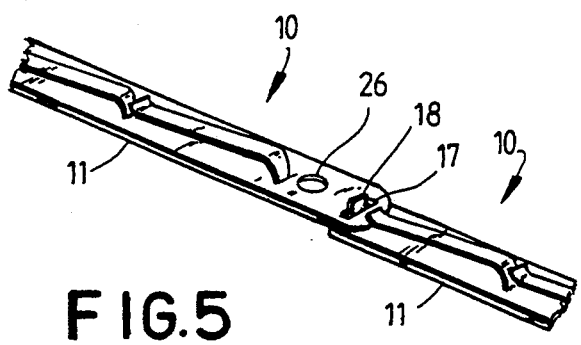
FIG. 5 illustrates the connection between adjacent elements indicated at A in FIG. 4.

Should the securing means 10 be required to be associated with a metal corrugated roof or metal decking as shown in FIGS. 4 and 5, the tongue 16 and hook 13 may be removed from the element 11. For this purpose the junctions between the hook 13, tongue 16 and the element 11 may be necked or formed with a reduced thickness regions 22 and 23 so that the hook 13 and tongue 16 may be simply detached from the the element 11 by being broken or snapped away therefrom. The securing means 10 which is then in a planar strip-like form may then be simply attached to sheeting of a metal roof 24 by means of rivets, screws or any other suitable fasteners 25 say through preformed apertures 26 in the elements 10. A plurality of such securing means 10 may be interconnected by insertion of the lugs 18 of one element 11 into the apertures 17 of adjacent elements so that an elongated aligned series of elements 11 can be formed. Alternatively and for a metal roof the securing means 10 may be made in continuous lengths of the element 11, being simply cut to size as desired.

As shown, the elements 11 are arranged to extend along a peak of a corrugation of the roof and at spaced apart corrugations so that the member or members to be secured to the roof are supported at spaced positions.

The securing means 10 may be formed of metal or resilient plastics material with all the elements thereof integrally formed or alternatively fabricated from separate components. Variations however, may be made to the configuration of the device. For example the clipping members 12 may comprise spring loaded clipping members or any other form of clipping or holding device. A further alternative would be to form the clipping members 12 so that they are pivotally or hingedly connected at one end to the body of the element 11 and releasably latched at their opposite ends to the body of the element 11 so that they can hold a member in position. Alternatively, the clipping members 12 may be secured to the body of the element 11 by one or more screws or similar fasteners at one or both ends so that the members 12 act as clamps to clampingly hold a member to the element 11.

Of course the size and shape of the members 12 may be varied to mate with any form of component to be secured to the roof.

As stated above the element 11 with integral clipping or holding members 12 may be formed in continuous lengths. In this form, the element 11 may be adapted for use with roof tiles by being cut to a desired length and provided with separate tongues 16 and hook 13 which may be detachably secured to the element 11 at desired positions.

Referring now to FIGS. 6 to 9 there is illustrated a modified form of securing means 30 according to the present invention which has components similar in many respects to those of the securing means 30 of FIG. 1 which components have been given like numerals. In this embodiment however, the tongue 16 is provided at its free end with an upwardly extending lug or projection 31 which in use acts as a stop to co-operates with a tile 19' in the manner shown in FIG. 9 for the purposes of further retaining and preventing detachment of the securing means 30 from the tiles 10 and 19'. The tongue 16 is additionally provided with a transversely extending slot 32 sized for location over the lug 33 in the manner described further below. The lug 33 in this embodiment is provided with a pair of downwardly and outwardly flared wings 34 which serve when respective securing means 30 are interengaged in the manner shown in FIGS. 4, 5 and 6A to positively hold and lock the securing 30 means together, the wings 34 when the lug 33 is located in the slot 17 preventing detachment of adjacent securing means 30.

The hook 13, in addition to the reduced thickness region 23 is provided in this embodiment with an additional intermediate reduced thickness line 35 and a aperture 36 between the line 35 and the element 11. The projecting rear portion 37 of the element 11 containing the slot 17 is also connected to the remainder of the element 11 by means of a transversely extending reduced thickness line 38 which permits the portion 36 to be broken away preferably by hand from the remainder of the element 11. The adjacent clipping member 12' is provided with a nipple-like projection 39 for a purpose which will hereinafter become apparent.

The securing means 30 for use with roofing tiles of the type shown in FIGS. 2 and 9 may be employed as described previously. Where, however, the securing means 30 is to be used with metal roofing tiles, such as those known under the trade mark DECRABOND, the tongue 16 is broken away from the element 11 at the region 23 and is reversed in attitude as shown in FIG. 7 and the slot 32 located over and engaged with the lug 33 so that the portion 40 of the tongue 16 presents an upwardly directed flange or hook. At the opposite end the portion 37 is broken away along the line 38 and the hook 13 broken away along the line 35 to thereby leave a downwardly directed flange 41 containing the aperture 36.

When positioned relative to a metal tile 42, the hook 40 locates under the uppermost tile 42', rearwardly of its downwardly directed flange 43'. The flange 41 is located adjacent the downwardly directed flange 43 of the tile 42 so that a nail or other fastening element 44 may be driven through the aperture 36 into the end flange 43 of the tile 42 and into the underlying roof batten 45. The securing means 30 will thus be positively and securely held between overlapping tiles 42 and 42'.

The securing means 30 in any of its forms and applications described above may be combined with a transparent panel 46 of the type shown in FIGS. 8 and 9. The panel 46 is preferably in continuous lengths and may be constructed of perspex, acrylic, Lexan or other like material. The panel 46 is provided at one end with a first curved flange 47 which is slotted in its return portion at 48 at spaced positions so as to enable it to be located over the lugs 33 of respective securing means 30. At its opposite edge, the panel 46 also includes a curved flange 49 provided with plurality of apertures or hollow dimples 50 for location over the end clips 12' for receipt of the lugs 39 thereon. As before, a multi-tube absorber or absorbers 21 are secured to spaced apart securing means 30 by the clips 12. The use of a glazing panel 46 as above will substantially increase the efficiency of heat collection within the solar absorbers 21 secured by the securing means 30 to the roof.

It will be apparent that the panel 46 may be in many different forms and engage with the securing means 30 (or 10) in any fashion. The opposite sides of the panel 46 may be provided with any form of recesses or configurations for engaging the securing means 30 (or 10) which may if desired be provided with separate engagement elements for engagement with the panel 46.

The panel 46 may also be provided on its opposite side edges with seals, such as rubber seals so as to reduce the flow of air about the absorbers 21 and thereby reduce heat loss. Such seals may be of channel section form and simply locate over the side edges of the panel. To further support the absorbers 21 additional securing means 30 may be provided, the additional securing means 30 in this case having the portions 16 and 13 removed and simply clip engaged with the panel 46 to be supported thereby.

All other modifications and variations to the invention as would be apparent to persons skilled in the art are deemed to fall within the broad scope and ambit of the appended claims.

I claim:

1. Securing means securing a solar absorber to a roof having a plurality of roof tiles comprising at least a first tile, a second upper tile overlapping at its lower end said first tile, and a third tile overlapped at its upper end by said first tile, said securing means including:
    an elongated element adapted to extend longitudinally of said first roof tile and be retained to said roof, said element having an elongated body portion,
    a downwardly stepped tongue at one end of, and integrally formed with, said elongated body portion and adapted to extend between overlapping portions of said first and second roof tiles so as to be retained therebetween, said downwardly stepped tongue spacing said elongated body portion in use above said first roof tile,
    means at an opposite end of said body portion for securing said element at the overlapping portions of said first and third tiles, and
    said elongated body portion of said element defining holding means for holding said absorber to said roof in an attitude extending transversely of said element and said roof tiles.

2. A solar absorber assembly including a solar absorber and a plurality of securing means securing said solar absorber to a roof, each said securing means including an elongated element adapted to extend along and be retained to said roof, said element defining holding means holding said solar absorber to said roof such that said solar absorber extends transversely of said element, and a transparent panel supported on respective said securing means and over said solar absorber.

3. Securing means securing a solar absorber to a roof comprising a plurality of roof tiles, said securing means including:
    an elongated element adapted to extend along and be retained to a said roof tile, said element including a lug at one end;
    a downwardly stepped tongue adjacent said lug, said tongue having an aperture in its leading end, said tongue being detachable from the reminder of said element by being severed from said element adjacent said lug, said tongue when detached from said element having its aperture engageable with a said lug of said element such that said tongue defines a hook for engagement under a roof tile.

4. Securing means according to claim 1 wherein said tongue includes an upwardly directed portion for restraining detachment of said tongue from between said overlapping portions of said first and second tiles.

5. A solar absorber assembly mounted to a roof comprising elongate roof sheeting, said solar absorber assembly including a multi-tube absorber, and securing means securing said absorber to said roof, said securing means including an elongated securing element, said securing element being attached to said roof sheeting so as to extend longitudinally thereof, each said element having:
   an upstanding member at one end of said element;
   an aperture at its opposite end for receiving the upstanding member of an adjacent said element whereby a plurality of said elements may be interconnected in longitudinal alignment;
   each said element defining holding means holding said solar absorber to said roof in an attitude extending transversely of said element and said roof sheeting.

6. A solar absorber assembly according to claim 5 wherein said upstanding member includes integrally formed retaining means adapted to co-operate with said aperture to prevent detachment of interconnected said elements.

7. A solar absorber assembly according to claim 5 wherein said elongated element has at least one opening therein and is attached to said roof sheeting by a fastener passing through said opening.

8. Securing means according to claim 1, wherein said means at said opposite end of said body portion comprises means for location under the lower end of said first tile.

9. Securing means according to claim 8, wherein said means for location under said lower end of said first tile comprises a hook for receipt of said lower end of said first tile.

10. Securing means according to claim 9 wherein said hook is of generally L-shaped form having a longer leg extending from said body portion and a shorter leg spaced from said longer leg so as to receive said end of said first tile therebetween.

11. Securing means according to claim 1 wherein said holding means includes at least one clip adapted to resiliently engage said absorber.

12. Securing means according to claim 11 wherein said clip comprises a resilient finger integrally connected to said body portion at one end and free at its other end.

13. Securing means according to claim 12 wherein a plurality of said fingers are spaced apart along said body portion.

14. A solar absorber according to claim 8 wherein said holding means comprise a plurality of resilient clips formed integrally with said element, said absorber being restrained beneath a said clip.

15. A solar absorber assembly mounted to a tile roof comprising at least a first tile, a second upper tile overlapping at its lower end said first tile, and a third tile overlapped at its upper end by said first tile, said solar absorber assembly including:
   a multi-tube solar absorber; and
   securing means securing said solar absorber to said roof, said securing means including:
      an elongated element, said element being held to said roof at its opposite ends between overlapping portions of said first and second and first and third tiles respectively,
      said elongated element holding said absorber to said roof in an attitude extending transversely of said element and said roof tiles.

16. A solar absorber assembly according to claim 15 wherein said elongated element has a main elongated body portion and a downwardly stepped tongue at one end of said body portion located between overlapping portions of said first and second tiles, said downwardly stepped tongue spacing said body portion above said first tile.

17. A solar absorber according to claim 16 wherein said tongue has an upwardly directed lug at its free end for preventing detachment of said tongue from said overlapping first and second tiles.

18. A solar absorber assembly according to claim 16 wherein a hook is provided at the opposite end of said body portion, said hook being located between the overlapping portions of said first and third tiles.

19. A solar absorber assembly according to claim 18 wherein said tongue and said hook are detachable from said body portion along lines of weakness adjacent said body portion.

20. A solar absorber assembly according to claim 18 wherein said body portion, tongue and hook are integrally formed from a plastics material.

* * * * *